United States Patent
Eleftheriou et al.

(10) Patent No.: US 9,135,181 B2
(45) Date of Patent: Sep. 15, 2015

(54) MANAGEMENT OF CACHE MEMORY IN A FLASH CACHE ARCHITECTURE

(75) Inventors: Evangelos Stavros Eleftheriou, Zurich (CH); Robert Haas, Zurich (CH); Xiao-Yu Hu, Zurich (CH)

(73) Assignee: International Business Machines Corporation, Armonk, NY (US)

(*) Notice: Subject to any disclaimer, the term of this patent is extended or adjusted under 35 U.S.C. 154(b) by 594 days.

(21) Appl. No.: 13/280,869

(22) Filed: Oct. 25, 2011

(65) Prior Publication Data

US 2012/0110247 A1    May 3, 2012

(30) Foreign Application Priority Data

Oct. 27, 2010 (EP) .................................. 10189014

(51) Int. Cl.
G06F 13/00 (2006.01)
G06F 13/28 (2006.01)
G06F 12/08 (2006.01)
G06F 12/02 (2006.01)

(52) U.S. Cl.
CPC ........ G06F 12/0888 (2013.01); G06F 12/0246 (2013.01)

(58) Field of Classification Search
CPC .................. G06F 12/0888; G06F 12/0246
See application file for complete search history.

(56) References Cited

U.S. PATENT DOCUMENTS

| | | | | |
|---|---|---|---|---|
| 8,285,918 | B2 * | 10/2012 | Maheshwari | 711/103 |
| 2010/0217953 | A1 * | 8/2010 | Beaman et al. | 711/216 |
| 2011/0145502 | A1 * | 6/2011 | Joshi et al. | 711/125 |
| 2012/0017034 | A1 * | 1/2012 | Maheshwari et al. | 711/103 |

OTHER PUBLICATIONS

Taeho Kgil, David Roberts, Trevor Mudge, "Improving NAND Flash Based Disk Caches", 2008, ISCA '08 Proceedings of the 35th Annual International Symposium on Computer Architecture, pp. 327-338.*
J.W. Hsieh et al., "Energy-Efficient and Performance-Enhanced Disks Using Flash-Memory Cache," ISLPED'07.
T. Kigil et al., "Improving NAND Flash Based Disk Caches," IEEE Proceedings of International Symposium on Computer Architecture, Jun. 2008, Beijing.
D. Narayanan et al., "Migrating Server Storage to SSDs: Analysis of Tradeoffs," EuroSys 2009.
L.A. Belady, "A Study of Replacement Algorithm for Virtual Storage Computers," IBM Sys. J., 1966, pp. 78-101, vol. 5, No. 2.
N. Meggido et al., "ARC: A Self-Tunning, Low Overhead Replacement Cache," in Proc. FAST Conf., 2003, pp. 115-130.
S. Bansal et al., "CAR: Clock with Adaptive Replacement," in Proc. FAST Conf., 2004.
B.S. Gill, et al, "WOW: Wise Ording for Writes—Combining Spatial and Temporal Locality in Non-Volatile Caches," in Porc. FAST Conf. pp. 129-142, 2005.

* cited by examiner

*Primary Examiner* — Eric S Cardwell
(74) *Attorney, Agent, or Firm* — Cantor Colburn LLP

(57) ABSTRACT

A method for managing cache memory in a flash cache architecture. The method includes providing a storage cache controller, at least a flash memory comprising a flash controller, and at least a backend storage device, and maintaining read cache metadata for tracking on the flash memory cached data to be read, and write cache metadata for tracking on the flash memory data expected to be cached.

16 Claims, 7 Drawing Sheets

MANAGEMENT OF CACHE MEMORY IN A FLASH CACHE ARCHITECTURE

CROSS REFERENCE TO RELATED APPLICATION

This application claims priority under 35 U.S.C. 119 from European Application 10189014.3, filed Oct. 27, 2010, the entire contents of which are incorporated herein by reference.

BACKGROUND OF THE INVENTION

1. Technical Field

The invention relates to the field of flash cache architecture for storage systems, and more specifically to a method of cache memory management.

2. Description of the Related Art

Cache is one of most widely used performance optimizations techniques in file and storage systems, exploiting temporal and spatial locality of workloads. Cache may exist in two forms: read cache and write cache, and typically relies on a faster storage device (e.g. DRAM) than the backend storage device (e.g. disks or RAID).

A read cache improves performance by transparently storing data such that future requests for that data can be served faster. If requested data is contained in the cache, that is, if a cache hit occurs, this request can be served by simply reading the cache, which is comparably faster than reading from the backend storage device. Otherwise a cache miss occurs and the data has to be fetched from the slower backend storage device.

A write cache improves performance by absorbing repeated writes and coalescing adjacent writes into a single write request to disks. A write cache has to be persistent, e.g., a battery-backed DRAM, for data protection against power failures.

Flash memory is emerging as a potential replacement for DRAM as cache for back-end, disk-based storage systems. Compared with DRAM, flash memory has a higher density, consumes much less power and is much less expensive on a $/GB basis. In terms of latency, flash memory is about 100 times faster than disk access, while 10 times slower than DRAM.

However, the read/write/erase behavior of flash memory is radically different from that of HDD or DRAM owing to its unique erase-before-write and wear-out characteristics.

Flash memory that contains data must be erased before it can store new data, and it can only endure a limited number of erase-program cycles, usually between 100,000 for single-level cells (SLC) and 10,000 for multiple-level cells (MLC). Flash memory is organized in units of pages and blocks. Typically, a flash page is 4 kB in size and a flash block has 64 flash pages (thus 256 kB).

Reads and writes are performed on a page basis, whereas erases operate on a block basis. Reading a page from flash cells to a data buffer inside a flash die takes 25 μs, writing a page to flash cells takes about 200 μs, and erasing a flash block typically takes 2 ms. Although the read and write operations take on the order of 10 μs, the erase operations take milliseconds. Therefore, using flash natively, such as for write-in-place, would not yield a high performance, and flash memory is universally used in the out-of-place write manner, analogous to the log-structured file system, for high-performance applications.

To hide the erase-before-write characteristics of flash memory and the excessive latency of block erases, modern flash SSDs implement a software layer, called flash translation layer. It performs logical-to-physical address translation, i.e., translating a logical block address (LBA) in the upper software layer to a physical address in flash memory.

To perform out-of-place writes, the controller of the SSD maintains a data structure for the pool of free flash blocks in which data can be written. How the data pages of free flash blocks are allocated to service user write requests is dictated by the data placement function. The controller maintains a data structure for the pool of occupied flash blocks in which valid and invalid pages may co-exist in the same flash block. A complete sequence of an out-of-place write is as follows: (i) choose a free flash page, (ii) write new data to it, (iii) invalidate the old page with the previous version of the data, and (iv) update the logical-to-physical address map to reflect the address change.

The out-of-place write necessitates a background routine called garbage collection (GC) to reclaim invalid pages dispersed in flash blocks. GC selects an occupied flash block as its target, copies valid pages out of the block, erases it, and if successful, adds it to the pool of free blocks for subsequent use. In addition, wear leveling can be triggered to balance the wear evenly among blocks, and bad block management keeps track of bad flash blocks to prevent their reuse. The controller may optionally use some DRAM as a write buffer to absorb repeated write requests and possibly to increase the workload sequentially.

It can be seen from the above that one critical issue for flash memory is the written amplification due to random writes, i.e., each single user write can cause more than one actual write, owing to background activities such as garbage collection and wear leveling. Write amplification occurs mainly because SSDs write data in an out-of-place mode, which requires garbage collection similar to a log-structured file system.

Thus, how to use and manage flash memory in a storage system as a cache is a challenging question.

Several straightforward approaches exist to integrate flash as a cache into a storage system. A first one includes an efficient data lookup and a set-associative caching strategy as disk cache to save disk power and improve overall read/write latency.

Another straightforward approach is to use flash memory in server platforms as a disk cache, and the overall performance and reliability can be improved by splitting flash based disk caches into read and write regions.

The impact of flash SSD as cache for server storage has been investigated, assuming least recently-used (LRU) read cache and cyclic-de-staging write cache. Unfortunately, this investigation focused on the performance and cost analysis aspects of flash cache, and it did not cover the important issue of how to manage flash memory.

SUMMARY OF THE INVENTION

In order to overcome these deficiencies, the present invention provides a method for managing cache memory in a flash cache architecture including: providing a storage cache controller, at least a flash memory including a flash controller, and at least a backend storage device; and maintaining read cache metadata for tracking on the flash memory cached data to be read, and write cache metadata for tracking on the flash memory data expected to be cached.

According to another aspect, the present invention provides a system for managing cache memory in a flash cache architecture including: a storage cache controller; at least a flash memory including a flash controller; and at least a backend storage device; wherein the system maintains at the storage cache controller a read cache metadata for tracking on the flash memory cached data to be read, and a write cache metadata for tracking on the flash memory data expected to be cached.

According to yet another aspect, the present invention provides a computer program product for managing cache memory in a flash cache architecture, the computer program product including: a computer readable storage medium having computer readable non-transient program code embodied therein, the computer readable program code including: computer readable program code configured to perform the steps of: maintaining read cache metadata for tracking on a flash memory cached data to be read, and write cache metadata for tracking on a flash memory data expected to be cached, wherein the flash cache architecture includes a storage cache controller, at least a flash memory including a flash controller, and at least a backend storage device.

BRIEF DESCRIPTION OF THE SEVERAL VIEWS OF THE DRAWINGS

A method and a system embodying the invention will now be described, by way of non-limiting example, and in reference to the accompanying drawings, where.

DETAILED DESCRIPTION OF THE PREFERRED EMBODIMENTS

Figure 1:
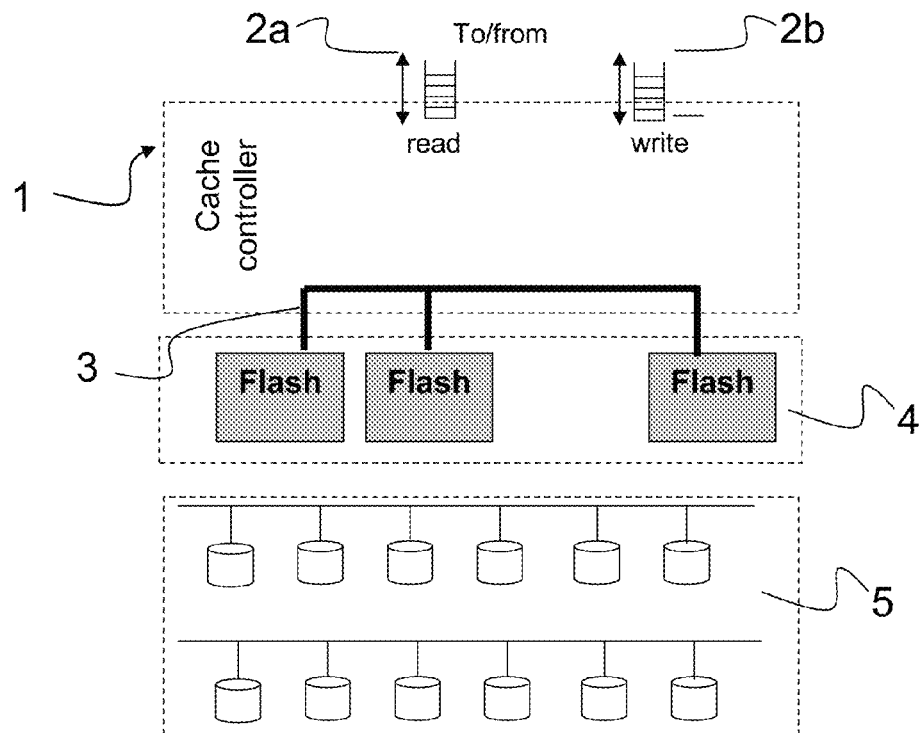
FIG. 1 is a schematic view of a flash cache architecture.

The present embodiment of the invention is directed to a method for managing cache memory in a flash cache architecture. The flash cache architecture includes a storage cache controller, at least a flash memory including a flash controller, and at least a backend storage device. The method according to an embodiment of the invention includes a step of maintaining a read cache metadata for tracking on the flash memory cached data to be read and a write cache metadata for tracking on the flash memory data expected to be cached.

Hence, the invention is directed to flash cache architecture for enterprise storage systems. The read and write cache metadata are separately managed. This allows for improving the management of the cache memory in term of efficiency and scalability of the flash cache architecture. Thus, the management of the cache memory according to an embodiment of the invention achieves substantial overall performance gains.

As will be appreciated by one skilled in the art, aspects of the present invention can be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) can be utilized. The computer readable medium can be a computer readable signal medium or a computer readable storage medium. A computer readable storage medium can include, but is not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or flash memory), an optical fiber, a portable compact disc read-only memory (CD-ROM), an optical storage device, a magnetic storage device, or any suitable combination of the foregoing. In the context of this document, a computer readable storage medium can be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium can be any computer readable medium that is not a computer readable storage medium and that can communicate, propagate, or transport a program for use by or in connection with an instruction execution system, apparatus, or device.

Program code embodied on a computer readable medium can be transmitted using any appropriate medium, including but not limited to wireless, wireline, optical fiber cable, RF, etc., or any suitable combination of the foregoing.

Computer program code for carrying out operations for aspects of the present invention can be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which includes one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 10:
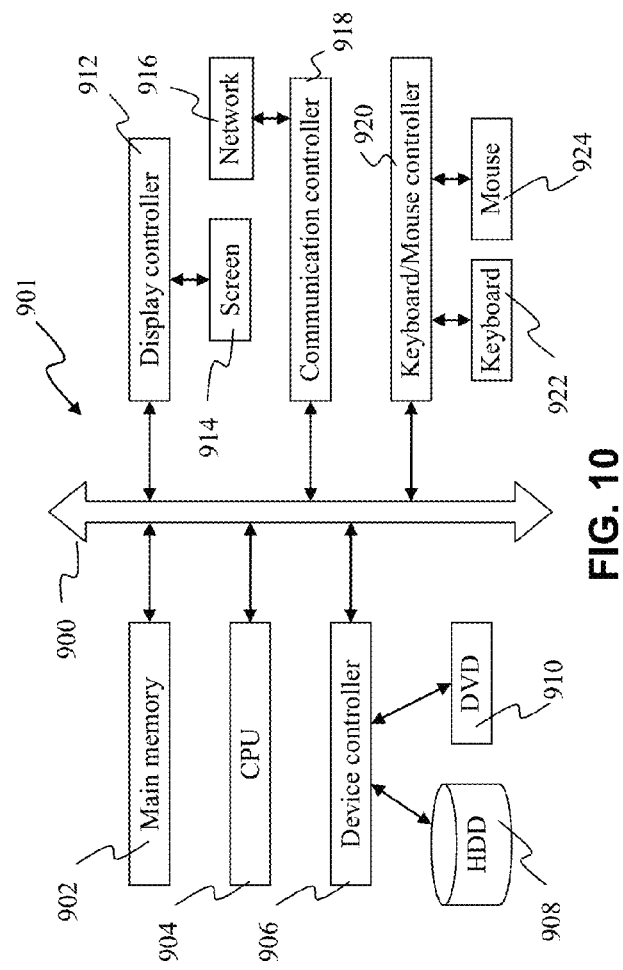
FIG. 10 is a block diagram of computer hardware according to an embodiment of the present invention.

FIG. 10 is a block diagram of computer hardware according to an embodiment of the invention. A computer system 901 according to an embodiment of the invention includes a CPU 904 and a main memory 902, which are connected to a bus 900. The bus 900 is connected to a display controller 912 which is connected to a display 914 such as an LCD monitor. The display 914 is used to display information about a computer system. The bus 900 is also connected to a storage device such hard disk 908 or DVD 910 through a device controller 906 such as an IDE or SATA controller. The bus 904 is further connected to a keyboard 922 and a mouse 924 through a keyboard/mouse controller 920 or a USB controller not shown. The bus is also connected to a communication controller 918, which conforms to, for example, an Ethernet registered trademark protocol. The communication controller 918 is used to physically connect the computer system 901 with a network 916.

FIG. 1 depicts an example of a flash cache architecture according to an embodiment of the invention. The cache controller 1 includes two input/output interfaces 2a and 2b for exchanging data and control signals or only control signals with a host adaptor (not represented on the figure). In practice, the host is a computer from which read/write requests originate and connects to a host adaptor of the storage system. The details of the Input/Output interfaces are not shown in FIG. 1.

The cache controller 1 is further connected to at least one flash memory. In FIG. 1, several flash memories are represented, and they are responsible for storing the read cache for the whole system and storing the write cache for the whole architecture. Flash memories 4 are connected to the cache controller 1 through the connections 3.

FIG. 1 further shows several storage devices which can be hard disks (HDDs), thus forming a backend storage system 5. Typically, the backend storage system is a disk array that is connected to the cache controller 1 through connections (not represented).

In a first embodiment of the invention, which is referred to as combined flash cache, an integrated cache and flash management to manage cached data objects with access to raw flash memory is used. In the combined flash cache design, the cache management and flash management are integrated tightly to make the best use of the entire flash memory. Advantageously, over-provisioning is not required. Over-provisioning is a technique used in the design of some flash memory that provides extra memory capacity (not accessible for the user) so that the flash controller can more easily create pre-erased blocks which are ready to be used. Thus, the combined flash cache design allows for use of the whole flash memory.

Figure 3:
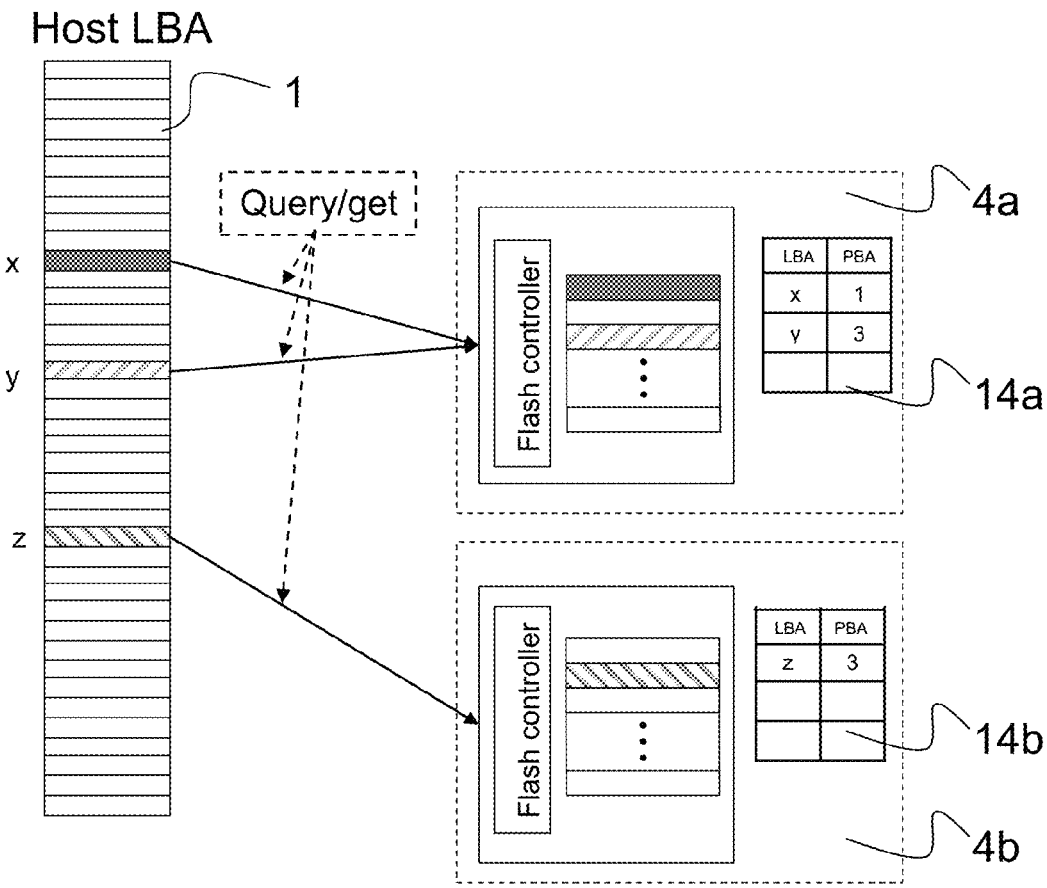
FIG. 3 is a schematic view of combined flash cache design in flash cache architecture.

FIG. 3 shows the interactions between the cache controller 1 and the flash memories 4a and 4b forming the flash cache of the flash cache architecture, as depicted in FIG. 1. In this embodiment, the cache controller 1 degrades to a path finder only, to decide where to query whether a specific data object is cached, and if yes, get the cached data from the relevant flash memory.

It is important to note that the cache controller 1 delegates cache management functions such as cache replacement algorithm to flash memory controller. In other words, the flash controller is also the actual cache controller, implementing both the cache management and flash memory management. The architecture allows flash management and cache management to combine to exploit the synergy, thus coining the name combined flash cache design.

To this aim, the cache controller 1 maintains information on the set of flash memories 4a and 4b connected to the cache controller, in order to decide where to query and where to get cached data. The controllers at flash memories 4a and 4b maintain a read cache metadata for tracking on them cached data to be read and a write cache metadata table for tracking on them data expected to be cached. Typically, the read and write metadata are stored in tables, e.g. a read cache metadata table and a write cache metadata table. Thus, modifications of the cached data are reflected in the read and write cache metadata by updating in the read and write cache metadata for each change occurring on the flash memory.

Each one of the flash memory 4a and 4b includes an address table 14a and 14b which is essentially a table of logical block addresses that map to flash physical block addresses (also known as PBA).

Logical block addressing (LBA) is a scheme used for specifying the address of blocks of data stored on storage devices. The addressing scheme is simple: blocks are identified by an index wherein a first data block is LBA=0, a second data block is LBA=1, and so on. The use of LBA enables access to PBA through translation of the physical storage address to, or from, a logical storage address.

The flash memories 4a and 4b thus form a physical space for caching data. The physical space can be partitioned space into a read cache and a write cache, such that data stored in the read and write caches are separated. In practice, any individual physical flash block can be either used to store data for read cache or for write cache, but not for both at the same time. For simplicity, a fixed number of physical flash blocks, Nr, are used by the read cache, and the rest, denoted by Nw, for write cache.

The controller of flash memory 4a and 4b is responsible for flash memory management, such as garbage collection, wear levelling, bad-block tracking, and it is also responsible for cache management, such as making decision about which LBA is to be cached and which is to be evicted from the cache. The flash memory management and the cache management functions are tightly combined, for the purpose of achieving high cache hit rate and reducing write amplification, which is described below.

Note that an interface (not represented) is present between storage cache controller 1 and the combined flash cache controller on flash memory, and the interface is not limited to query and get. It can be naturally extended to contain more commands so as to let the storage cache controller participate in cache management.

Figure 4:
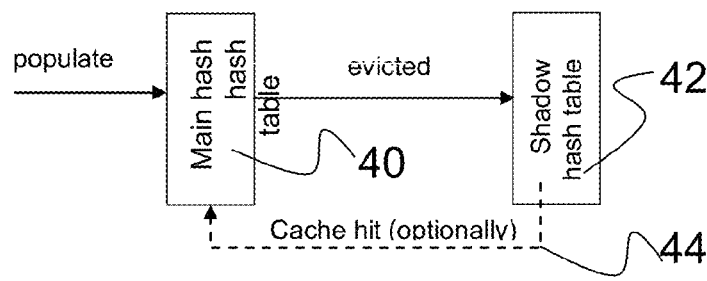
FIG. 4 is a schematic view of metadata management of a read cache in a combined flash cache design.

FIG. 4 depicts a schematic view of maintaining of a read cache metadata in a combined flash cache controller design which manages flash memory 4a and 4b. The read cache can include two hash tables 40 and 42, as read cache metadata symbolized by 14a and 14b, to manage cached data on flash memory, namely a main hash table 40 and a shadow hash table 42 that together form a cascade of two hash table. A hash table is a data structure used to map identifying values to associated values. A hash function, with a mathematical function taking a variable-size input and returning a fixed-size string called hash value, is used to create the hash table.

Both hash tables 40 and 42 store the metadata of the read cache in support of fast lookup. Each entry in both tables is a map between a host logical address and a physical address of flash memory, indicating that a data page addressed by the logical address is stored at the physical address of the read cache. The main difference of the main hash table 40 and shadow table 42 is that the cached data pages tracked by the shadow hash table are marked as invalid. Pages tracked by both hash table 40 and shadow table 42 are still available for read. Pages marked as invalid still contain valid data that can be served. However, pages marked as invalid can eventually be discarded; for instance by a garbage collection.

Figure 6:
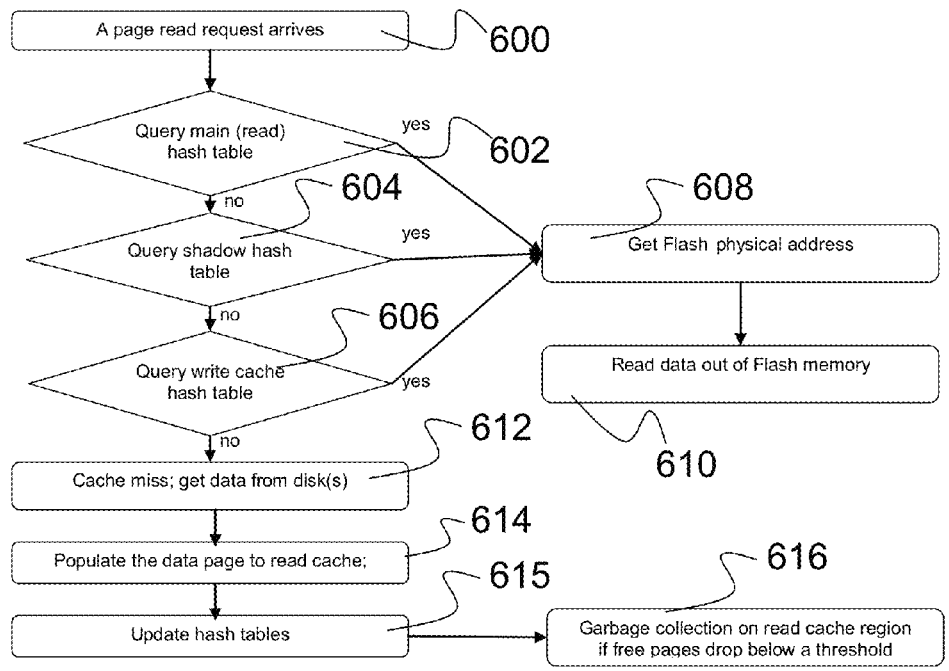
FIG. 6 is a flowchart depicting an embodiment for managing flash cache upon receipt of a reading request, according to the invention.

FIG. 6 is a flowchart depicting an embodiment for managing flash cache upon receipt of a reading request, according to an embodiment of the invention.

Upon the arrival of a read request (step 600), a query is performed on the read cache metadata table for retrieving the address of the data to be read. To this aim, the main hash table is queried (step 602) in order to obtain the flash physical address of the data to be read (step 608). If the main hash table does not contain the address of the data, then the shadow hash table is queried (step 604) for getting the address. Similarly, if the shadow hash table does not provide the address of the data, then the write cache table is in turn queried (step 606). In other terms, queries are performed one after the other on the main hash table, the shadow hash table, and the write cache table (steps 602, 604, 606) (all are metadata tables) for retrieving the address of the data to be read. If there is an entry corresponding to the requested address (that is, to the requested LBA), this is a cache hit (step 608). Upon a cache hit, the requested data are read from the flash using the physical address indicated by one of the hash tables (step 610).

Otherwise, if there is no entry corresponding to the requested address on the main hash table, the shadow hash table and the write cache table, it is a cache miss. Upon a cache miss, the requested data are directly fetched at a back-end storage device (step 612), for instance the backend storage system 5 as depicted on FIG. 1. Subsequently, the fetched requested data is sent back to a user, and in the meantime (or afterwards) written to flash memory (step 614). The read cache metadata is then updated (step 615) with the address in the flash memory of the requested data written thereon; this amounts to saying that the main hash table is populated.

Referring back to FIG. 4, maintenance of the read cache metadata is now detailed. On a cache miss upon the arrival of a read request, the main hash table 40 is populated, that is, the address of the fetched requested data is part of an entry in the read cache.

Now if the size of main hash table is bigger than a predefined size, one entry, is removed from the main hash table and added to the shadow hash table. In other words, an entry evicted from main hash table enters the shadow hash table. Once entered in the shadow hash table, the corresponding address in the flash memory is marked as invalid.

Optionally, on a cache hit 44 upon the arrival of a read request, if the shadow hash table includes the address of the data, then the entry can be sent back to the main hash table. Advantageously, this allows for retaining in the main hash table the freshest cached hits, thus increasing the probability of a cache hit for the next read requests.

In practice, the page of the flash memory stores the fetched cached data. Furthermore, the decision to move the can be made at the cache controller of the flash cache architecture and decided by a cache replacement algorithm, such as LRU, ARC or CAR.

Referring back to FIG. 6, a garbage collection can be performed on the read cache (step 616). If the total space on the flash memory of read cache exceeds a predefined threshold, then garbage collection is triggered on the read cache. In practice, the number of flash blocks used for read cache shall not exceed a predefined number. When performed on a selected space of the read cache space, the garbage collection carries out a relocation of the data cached in the read cache together. Meanwhile, the read cache metadata is updated in accordance with the relocation of the data cached. Some cached data are also discarded in the read cache metadata, for instance cached data marked as invalid.

In practice, depending on which garbage collection algorithm is used, for example a greedy garbage collection policy that selects the flash block having the largest number of invalid pages (irrespective of whether they were marked as invalid by the cache replacement algorithm or through the usual updating mechanism), a particular flash block is selected as the target, that is, as the flash block on which the garbage collection is performed. All valid data pages—the pages storing cached data tracked by the main hash table—on that block are relocated to another place, and the main hash table is updated to reflect these physical address changes. Then, all invalid data pages—including those storing cached data tracked by the shadow hash table—on that block are simply discarded, and the corresponding map entries are removed from the shadow hash table accordingly.

The efficiency of the garbage collection on the read cache, i.e. the write amplification, depends on the average number of valid data pages per flash block, among other factors such as the garbage collection policy, etc. In general, the larger the predefined size of the main hash table, the better the cache hit rate, but the worse the write amplification. One advantage of this design is that, although the data tracked in the shadow hash table can virtually be thought of as invalid for possible garbage collection, they are still available for read cache unless they are really discarded by garbage collection, which improves the cache hit rate, without deteriorating write amplification. The cached data pages tracked by the main hash table are treated as valid by the garbage collection and are relocated.

Figure 7:
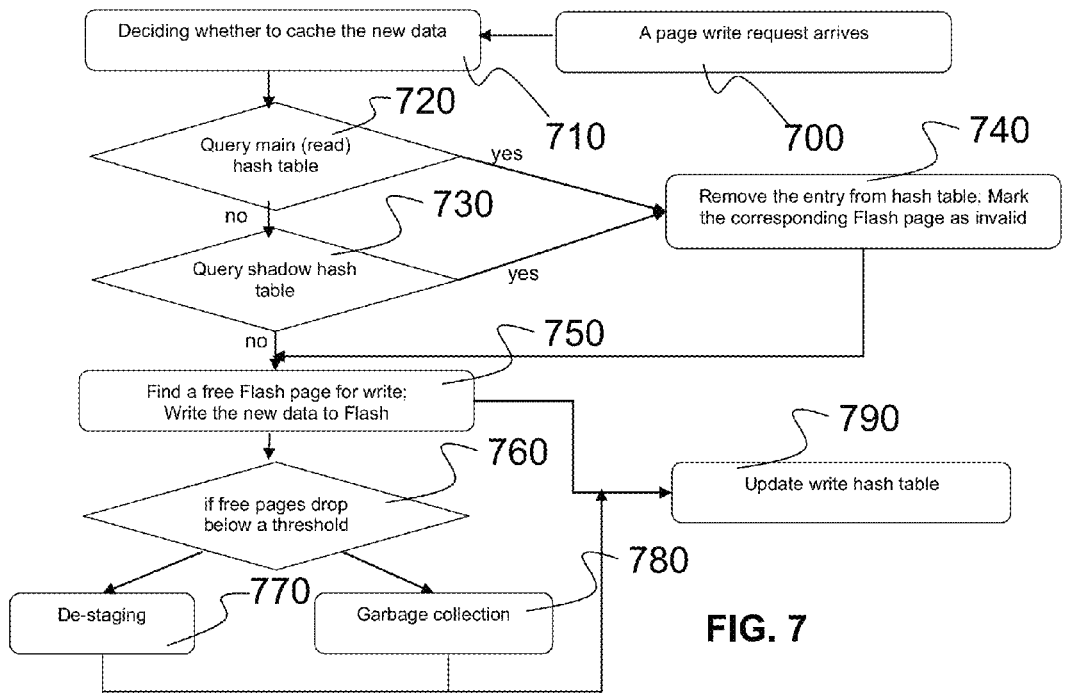
FIG. 7 is a flowchart depicting an embodiment for managing flash cache upon receipt of a writing request, according to the invention.

FIG. 7 is a flowchart depicting an embodiment for managing flash cache upon receipt of a writing request.

Upon receipt of a write request (step 700), it is decided whether or not to cache given data (step 710). The decision can be performed at the storage cache controller level, for instance the storage cache controller depicted on FIG. 1. If it is decided to cache the data, the read cache metadata is queried for identifying whether an entry exits therein; otherwise, the data is discarded. In practice, the main hash table is first queried (step 720), and if an entry is identified, then the identified entry is removed from the read cache metadata and the corresponding data cached on the flash memory is marked as invalid (step 740). On the contrary, if the main hash table does not contain an entry, then the shadow hash table is queried (step 730). Similarly, if the shadow hash table contains an entry, then the identified entry is removed from the read cache metadata and the corresponding data cached on the flash memory is marked as invalid (step 740). In the case that the shadow hash table does not contain an entry, free space is found on the flash memory for writing the data, and the data are then written on the free space (step 750).

Once the data are written on the flash memory, the write cache metadata is updated: the address of the given data is written to track the newly cached data (step 750). Thus, the write cache metadata is maintained. For fast look-up, the write hash table is used to track all dirty data (modified data not yet written to disk) stored on flash memory as a write cache. In practice, after steps 700 to 740 occur, a particular flash page of the flash memory is selected for caching the data. The flash controller tracks all free pages so that it is possible to provide a free page.

If free space on the flash memory (e.g. on the write cache on the flash memory) drops below a threshold (step 760), then a garbage collection (step 780) and/or a de-staging (step 770) are performed. Following the garbage collection or the de-staging, the write hash table is updated accordingly. It is to be understood that the garbage collection and the de-staging process can be carried out in parallel, successively, or independently.

Figure 5:
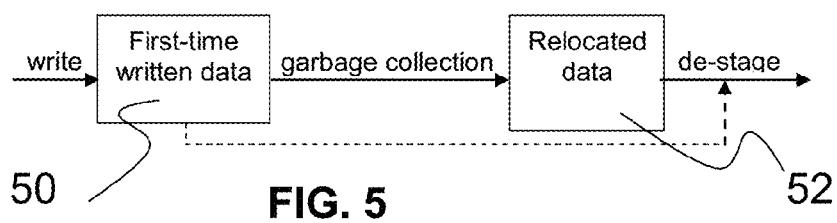
FIG. 5 is a schematic view of metadata management of a write cache in a combined flash cache design.

FIG. 5 depicts a schematic view of metadata management of a write cache in a combined flash cache design. Upon receipt of a write request, it is first checked whether it is the first time the data is written 50 on the flash memory. If yes, the write cache metadata is updated for tracking the new cached data.

A garbage collection process is triggered to reclaim free space on the flash memory. The garbage collection process is similar to the one performed for the read cache. If the total space on the flash memory of write cache exceeds a predefined threshold, then garbage collection is triggered on the read cache. When performed on a selected space of the write cache space, the garbage collection carries out a relocation of the data cached in the read cache together. Meanwhile, the write cache metadata is updated in accordance with the relocation of the data cached. Some cached data are also discarded in the write cache metadata, for instance cached data marked as invalid.

In practice, the garbage collector is triggered once the write cache is full, that is, there is no more available space on the flash memory for writing data expected to be cached. The selected spaces on the flash memory can be those that have the largest number of invalid data pages. The relocated valid data pages 52 are then stored together in the same block.

When the number of valid data exceeds a predetermined threshold, a de-staging process is triggered to de-stage the oldest relocated, still valid data to a backend storage device, e.g. the backend storage system 5 of FIG. 1. In practice, the predetermined threshold is a certain number of pages containing valid data. It is to be understood that valid data are data not marked as invalid. During the de-staging process, the cached data are grouped together based on proximity of the cached data, and previously relocated cached data are de-staged. For instance, the cached data with adjacent LBAs are grouped together and coalesced into a single disk request. Advantageously, this makes the de-staging more efficient. One can note that the de-staging may de-stage any cached data from the write cache, whether it has been relocated or not, owing to the coalescing.

The write cache can naturally be extended to limit de-staging on data pages that have been relocated once or more. It can also have no limitation at all to simply allow garbage collection and de-staging occurring independently (but on different pages of course).

In contrast to a circular-buffer like write cache which periodically de-stages cached data, this embodiment is based on a combination of garbage collection and de-staging, in order to reduce disk activities: the advantage lies in the effective use of flash memory for storing dirty data by enabling garbage collection on write cache.

Figure 8:
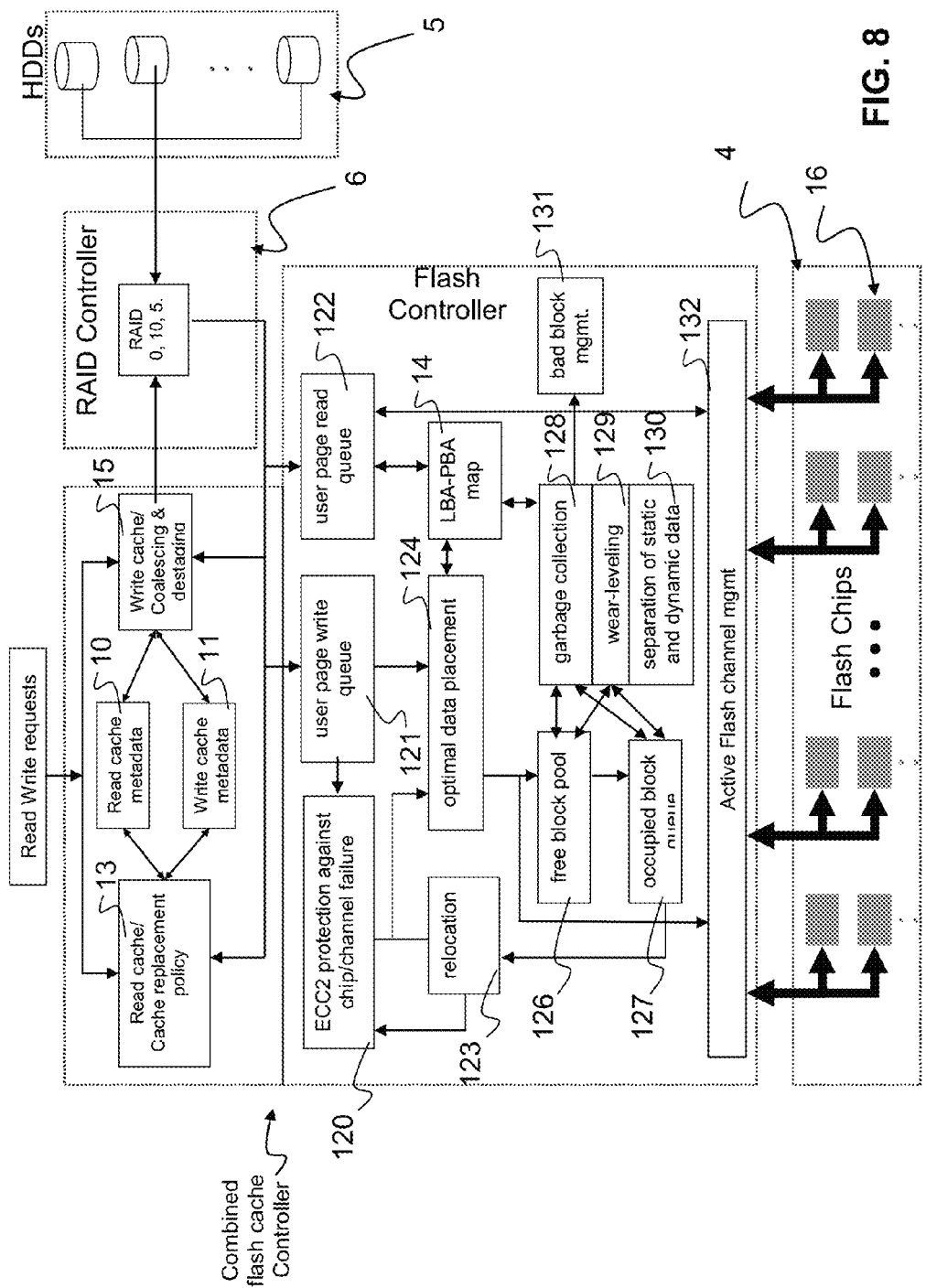
FIG. 8 is a schematic view of an embodiment of a combined flash cache.

FIG. 8 is schematic view of an embodiment of a combined flash cache architecture. The combined flash cache controller manages the read 10 and write 11 cache metadata separately. The combined flash cache controller further manages cache replacement policy 13 of the read 10 and write 11 cache metadata and coalescing and de-staging processes 15 of the read and write cache metadata.

The combined flash cache controller is connected with the flash memory module 4, and more specifically through read 121 and write 122 queues, which manages the flash chips 16 on which the cached data and the data expected to be cached are physically stored. The flash chips 16 are managed through active flash channel managements 132.

The combined flash cache controller implements several functions to manage flash memory. It may implement an error-correcting code (ECC) 120 for detecting and correcting chip and/or channel failure without the need to ask for additional data.

A set of functions 123, 124, 126, 127 are dedicated to the placement of data in the flash chips and the management of free space on the flash chips—typically free pages or free blocks—. The flash blocks reclaimed either from read or write cache are managed by a single free block pool 126. Any flash block in the free block pool 126 can be freely used for read cache or write cache, but not both at the same time. After a flash block fills up with populated data (owing to read cache miss), or with dirty data (write data not yet de-staged to disks), it is added to the occupied block queues 127 for read cache and write cache, respectively.

The combined flash cache controller further includes an address table 14 of contiguous logical block addresses that map to flash physical block. A function is implemented which deals with bad blocks 131; these blocks are a damaged area of flash chips and can no longer be used for storing data.

The combined flash cache controller further implements a garbage collection 128 that discards useless pages in the flash cache, e.g. in the read cache and write cache, and a function 130 for separating static data and dynamic data.

Moreover, a background wear-leveling function 129 is implemented and used to monitor the age of the data on a flash block. If the age of the data is old enough and that block has a much less usage than other flash blocks, this block is then forced to be reclaimed. The wear-leveling process can thus guarantee all flash blocks to be used evenly and can possibly be combined into the garbage collection process.

The combined flash cache controller is connected to a controller 6 dedicated for the management of the backend storage system 5. For instance, the controller 6 is a RAID (Redundant Array of Independent Disks) controller that manage an array of physical storage devices such as hard disks. In another embodiment of the invention, which is referred to as memory-mapped design, an off-the-shelf flash SSD is used as the data store for the cached data.

Figure 2:
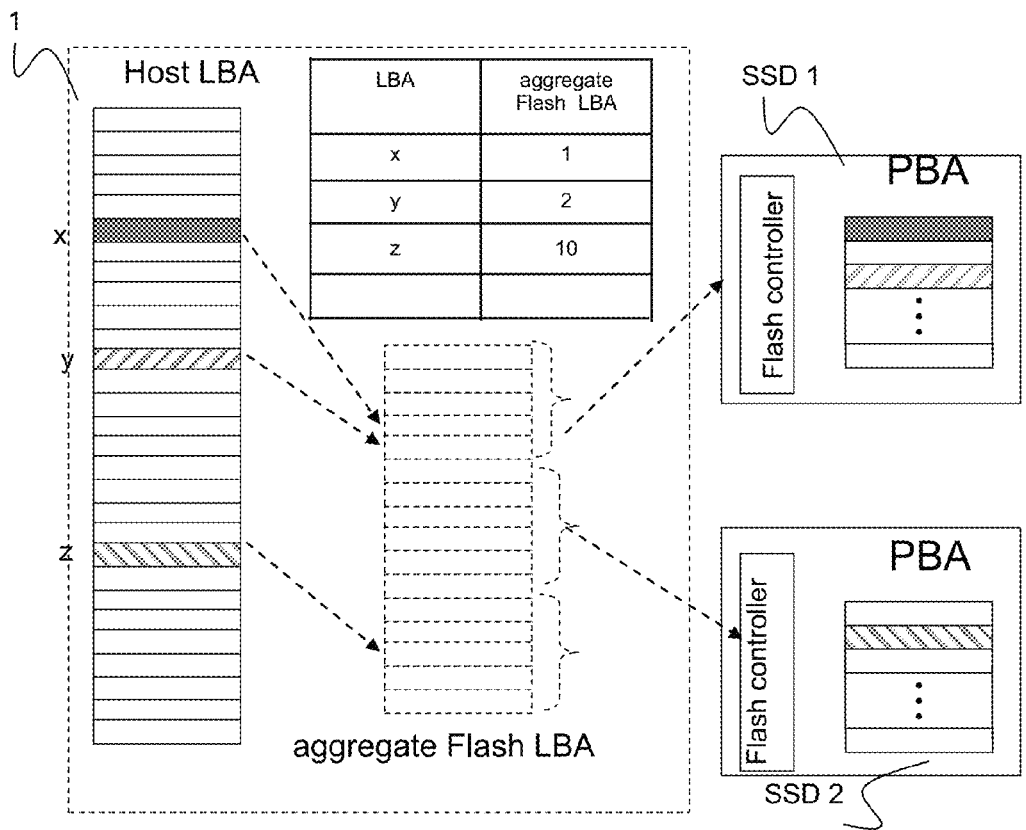
FIG. 2 is a schematic view of memory-mapped design in flash cache architecture.

FIG. 2 shows the interactions between the cache controller 1 and the flash Solid-state drives SSD1, SSD2 forming the flash cache of the flash cache architecture as depicted in FIG. 1. The cache controller 1 manages which data has to be cached and on which solid-state drives be cached, and also manages which cached data is to be read.

To this aim, the read and write cache metadata tables are maintained at the cache controller which further provides a mapping between cached host LBA-addressed blocks and flash LBA-addressed blocks. Thus, all existing cache replacement and de-staging algorithms, such as LRU, ARC, CAR, WOW, can be directly applied by viewing the logical address space of flash SSD as a memory space for storing cached data objects.

In order to improve the memory-mapped design, the total logical address space used by the cache controller is a fraction, often in the range of 0.5 to 0.9, of the total physical flash memory capacity. This treatment is called over-provisioning. Over-provisioning is critical for SSD to control write amplification and improve endurance lifetime.

The SSD may extend its set of supported commands, for example, to include the trim command to let the cache controller invalidate data that are selected by the cache replacement or de-staging algorithms. The use of the trim command may help SSD to reduce write amplification during the garbage collection process.

Another extension is to partition the SSD physical space into a read cache and a write cache, such that data stored in read and write cache are separate. This treatment may improve the garbage collection efficiency of SSDs.

Figure 9:
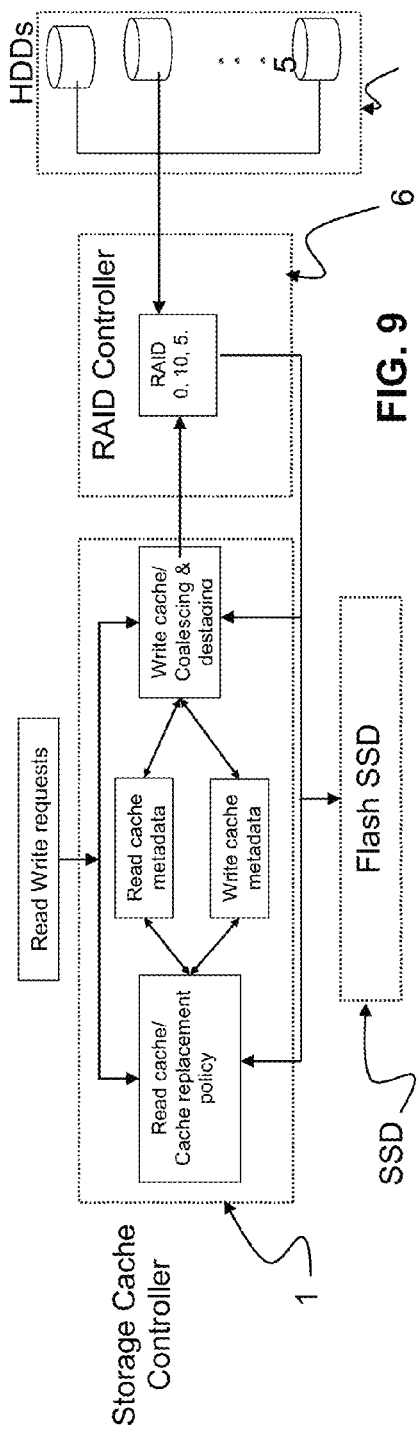
FIG. 9 is a schematic view of an embodiment of a memory-mapped flash cache.

FIG. 9 is schematic view of an embodiment of the memory-mapped cache design. The storage cache controller 1 is similar to the one depicted on FIG. 8, except that a mapping between cached host LBA-addressed blocks and flash LBA-addressed blocks is provided.

The solid-state disk SSD encapsulating the physical flash memory and the details of flash management, such as FTL, garbage collection, wear leveling and bad block management, are handled inside the SSD and completely transparent to the storage cache controller 1. The SSD exposes a standard block-device interface (not represented) to the storage cache controller 1, supporting the following two basic commands: reading a logical page and writing a logical page; a logical page refers to a page addressed by logical block address. This way, the SSD can be viewed as a virtual page-based memory for the cache controller.

Figure 11:
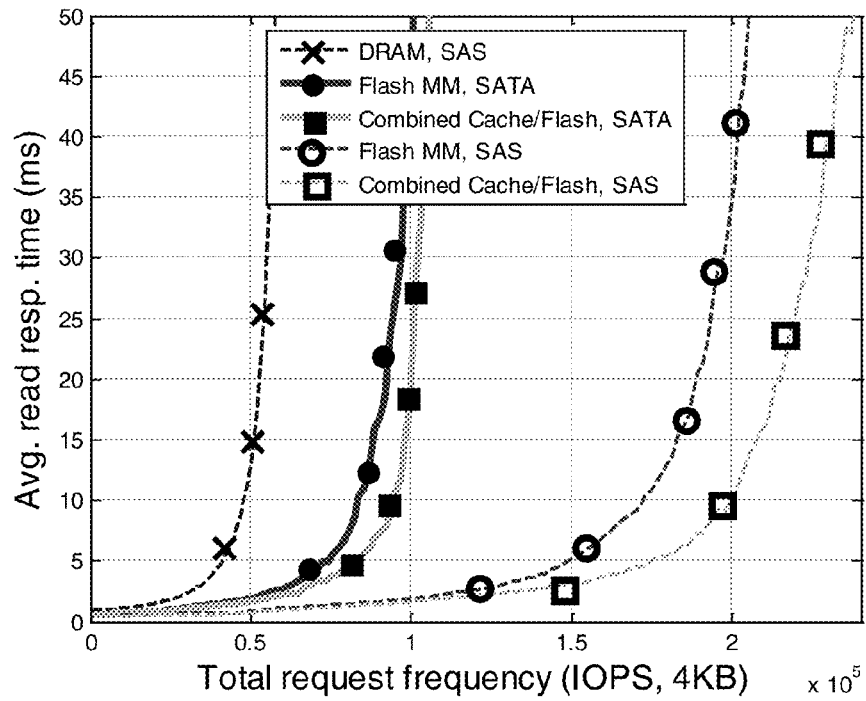
FIGS. 11 and 12 show a comparison of the average read and write response time, respectively, as a function of increasing IOPS, between five flash cache configurations.
Figure 12:
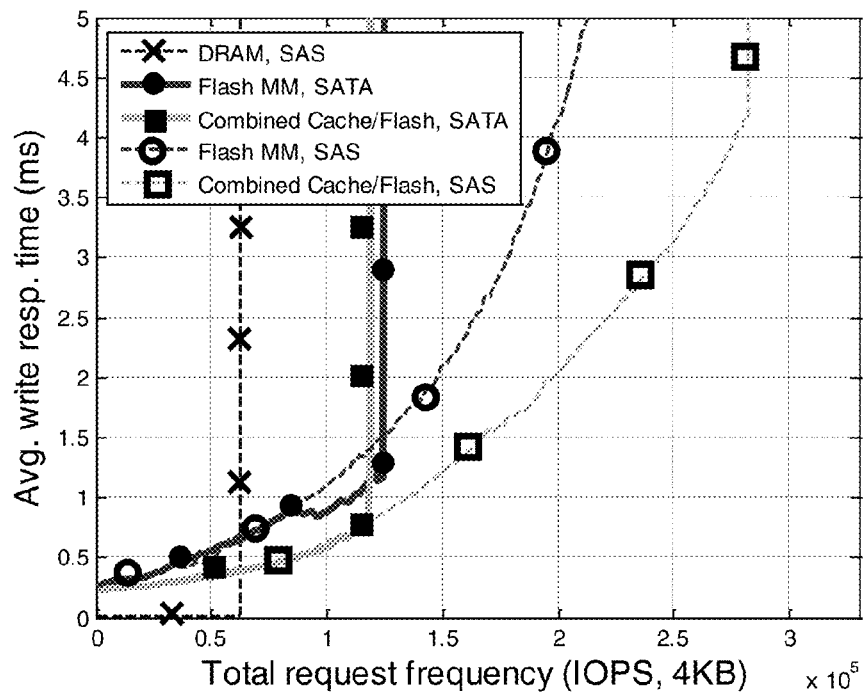
Figure 13:
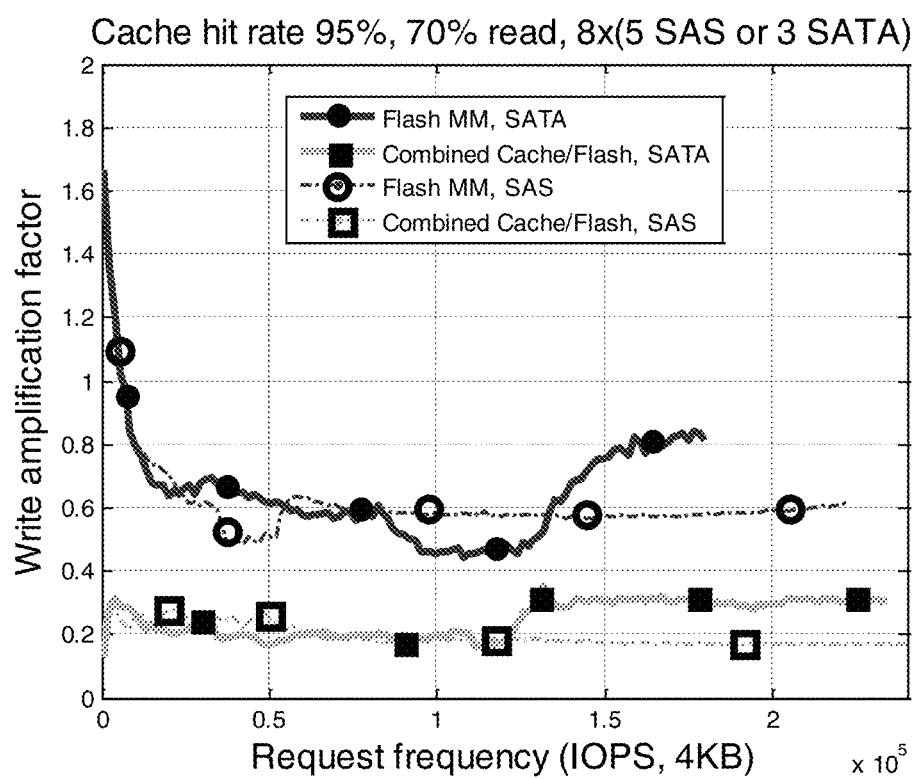
FIG. 13 shows a comparison of the write amplification between four flash cache configurations.

FIGS. 11-13 show comparison between the performances of combined flash cache and memory-mapped flash cache. Simulated low-level flash read/write/erase commands have been tested and verified against real flash memory controlled by an evaluation board. The low-level disk read and write behaviors are simulated following the model developed by Ruemmler C. and Wilkes J. in "An introduction to disk drive modeling", in IEEE Computer, volume 27, pages 17-28, Mar. 3, 1994. In particular, details such as seek time, rotational latency, data transfer latency, pre-fetching, disk cache, sector layout on cylinder and tracks, head/cylinder switch latency are fully captured in the simulator. The low-level disk simulator has been calibrated against a mainstream, real HDD and demonstrated a very high level of accuracy. It has been successfully used to study the intra-disk redundancy (IDR) scheme for combating latent media errors of HDDs. RAID-0 layer on top of disks is implemented, and for each disk, a C-SCAN scheduling algorithm is implemented based on LBA to improve disk throughput.

One considers two back-end disk systems with the same total disk capacity. Each system includes 8 disk arrays of RAID-0. In each array, the first system uses 5 SAS 10 k rpm disks, each with 300 GB, and the second system uses 3 SATA 7200 rpm disks, each with 500 GB. The sizes of the read or write caches are given by the ratio of the read/write cache size over the total back-end disk capacity, denoted as r. The following 5 cache configurations have been considered: (1) DRAM as cache with r=0.09% for read cache and r=0.01% for write cache, and SAS disks as back-end; (2) memory-mapped (MM) flash cache with r=2.5% for read and write cache respectively, and SATA disks as back-end; (3) combined flash cache with r=3.57% for read and write cache respectively, SATA disks as back-end; (4) the same configuration as (2) but with SAS disks as back-end; (5) the same configuration as (3) but with SAS disks as back-end. One can note that in the case of combined flash cache, the cache size ratio is measured based on the total physical flash memory capacity, while in the case of MM flash cache, the cache size ratio r is measured based on the logical space available to the cache management, although the total physical flash memory capacity is the same as in the case of combined flash cache.

One considers a synthetic workload following a Zipf distribution with exponent 1.25. This workload is widely used to model a highly-concentrated access pattern in which a small portion of LBA space predominantly receives most accesses. The workload includes 70% read and 30% write requests, each of fixed size 4 KB, and the arrival time distribution is random and uniformly distributed.

FIGS. 11 and 12 show the average read and write response time, respectively, as a function of increasing IOPS (Input/Output Operations Per Second), for the 5 cache configurations. It can be seen that all of the four flash cache configurations provide a significant performance boost versus the smaller-sized DRAM counterpart.

FIG. 13 shows the write amplification of the four flash cache configurations. It demonstrates the effectiveness of the garbage collection of the proposed schemes, which do not cause overwhelming write amplification.

The invention claimed is:

1. A method for managing cache memory in a flash cache architecture, the method comprising:
providing a storage cache controller, an at least one flash memory comprising a flash controller, and an at least one backend storage device:

wherein said storage cache controller is said flash controller and said flash controller implements both a cache management and a flash management; and maintaining, at said storage cache controller, a read cache metadata for tracking on said at least one flash memory a cached data to be read and a write cache metadata for tracking on said at least one flash memory data expected to be cached;

receiving a read or write request, thereby using said flash memory as the cache;

querying, upon receipt of said read request, said read cache metadata for retrieving an address of said data to be read by consecutively querying a main hash table, a shadow hash table, and said write cache metadata, which are each disposed on the at least one flash memory.

2. The method according to claim 1, further comprising, for a cache miss consecutive to querying said read cache metadata:
fetching said requested data at said backend storage device;
writing said fetched requested data in said flash memory; and
updating said read cache metadata with said address of said requested data written in said flash memory.

3. The method according to claim 2, further comprising updating of said main hash table of said read cache metadata by:
determining that the size of said main hash table exceeds a predetermined threshold;
moving an entry of said main hash table to said shadow hash table; and
marking as invalid the address associated with said moved entry.

4. The method according to claim 1, further comprising, upon receipt of a write request:
deciding whether to cache said data expected to be cached;
writing said data on said flash memory; and
updating said write cache metadata with said address of said data in said flash memory.

5. The method according to claim 4, further comprising, after deciding whether to cache said data expected to be cached:
querying said read cache metadata for determining whether an entry exists of said data expected to be cached; and
wherein an entry exists, removing said identified entry from said read cache metadata and marking said data corresponding to said data expected to be cached as invalid in said flash memory.

6. The method according to claim 1, wherein said flash memory is partitioned into a read cache and a write cache, further comprising:
determining that the size of said read or write cache exceeds a predefined threshold;
triggering, according to a result of said determining step, a garbage collection on said read or write cache, said garbage collection comprising:
relocating together data cached in said read cache or in said write cache;
updating said read cache metadata table or said write cache metadata table in accordance with said relocating step; and
discarding cached data marked as invalid.

7. The method according to claim 6, further comprising:
determining that a number of valid data exceeds a predetermined threshold;
grouping together cached data, said grouping being performed based on the proximity of said cached data;
and de-staging previously relocated cached data.

8. The method according to claim 1,
wherein said flash controller is a combined flash cache controller;
wherein a step of querying and getting at said storage cache controller cached data on said combined flash cache controller is carried out; and
wherein said step of maintaining said read and write cache metadata is implemented by said combined flash cache controller.

9. The method according to claim 1,
wherein said storage cache controller acts as path finder for host LBA addresses; and
wherein said read and write cache metadata provide LBA-to-PBA mappings.

10. The method according to claim 1,
wherein said storage cache controller implements cache management functions such as a cache replacement algorithm; and
wherein said flash memory is comprised in a flash solid-state drive that implements flash memory management function separately.

11. The method according to claim 10, wherein said maintaining comprises maintaining at said storage cache controller read and write cache metadata tables to provide a mapping between cached host LBA-addressed blocks and flash LBA-addressed blocks, where said cached data is stored.

12. A system for managing cache memory in a flash cache architecture, the system comprising:
a storage cache controller;
an at least one flash memory comprising a flash controller, a main hash table, a shadow hash table, and said write cache metadata, wherein the main hash table includes data pages stored in the at least one flash memory marked as valid that are available to be read and the shadow hash table includes data pages stored in the at least one flash memory marked as invalid that are available to be read; and
an at least one backend storage device;
wherein said system maintains, at said storage cache controller, a read cache metadata for tracking on said at least one flash memory a cached data to be read and a write cache metadata for tracking on said at least one flash memory data expected to be cached; and
wherein said storage cache controller is said flash controller and said flash controller implements both a cache management and a flash management and said flash memory is used as the cache.

13. A computer program product for managing cache memory in a flash cache architecture, the computer program product comprising:
a computer readable storage medium having computer readable non-transient program code embodied therein, the computer readable program code comprising:
computer readable program code configured to perform the steps of a method for managing cache memory in a flash cache architecture, the method comprising:
maintaining, at a storage cache controller, a read cache metadata for tracking on an at least one flash memory a cached data to be read and a write cache metadata for tracking on said at least one flash memory data expected to be cached;
receiving a read or write request, thereby using said flash memory as the cache; and
querying, upon receipt of said read request, said read cache metadata for retrieving an address of said data to be read by consecutively querying a main hash table, a shadow hash table, and said write cache metadata, which are each disposed on the at least one flash memory;

wherein said flash cache architecture comprises a storage cache controller, said at least one flash memory comprising said flash controller, and an at least one backend storage device; and wherein said storage cache controller is said flash controller and said flash controller implements both a cache management and a flash management.

14. The computer program product according to claim 13, the method further comprising, for a cache miss consecutive to querying said read cache metadata:

fetching said requested data at said backend storage device;

writing said fetched requested data in said flash memory; and updating said read cache metadata with said address of said requested data written in said flash memory.

15. The computer program product according to claim 14, the method further comprising updating of said main hash table by:

determining that the size of said main hash table exceeds a predetermined threshold;

moving an entry of said main hash table to said shadow hash table; and marking as invalid the address associated with said moved entry.

16. The computer program product according to claim 13, the method further comprising, upon receipt of a write request:

deciding whether to cache said data expected to be cached;

writing said data on said flash memory; and updating said write cache metadata with said address of said data in said flash memory.

* * * * *